United States Patent
Kiselev

(10) Patent No.: US 10,837,502 B2
(45) Date of Patent: Nov. 17, 2020

(54) ATHLETE TRAINING DEVICE

(71) Applicant: Andrei Petrovich Kiselev, Moscow (RU)

(72) Inventor: Andrei Petrovich Kiselev, Moscow (RU)

( * ) Notice: Subject to any disclaimer, the term of this patent is extended or adjusted under 35 U.S.C. 154(b) by 262 days.

(21) Appl. No.: 16/061,811

(22) PCT Filed: Dec. 4, 2015

(86) PCT No.: PCT/RU2015/000849
§ 371 (c)(1),
(2) Date: Jun. 13, 2018

(87) PCT Pub. No.: WO2017/078564
PCT Pub. Date: May 11, 2017

(65) Prior Publication Data
US 2018/0372170 A1    Dec. 27, 2018

(30) Foreign Application Priority Data
Nov. 2, 2015  (RU) .................................. 2015146974

(51) Int. Cl.
*F16D 37/02*    (2006.01)
*A63B 21/005*    (2006.01)
(Continued)

(52) U.S. Cl.
CPC .......... *F16D 37/02* (2013.01); *A63B 21/0057* (2013.01); *A63B 21/0058* (2013.01);
(Continued)

(58) Field of Classification Search
CPC ....... F16D 37/02; A63B 21/0056–0058; A63B 21/151; A63B 21/154; A63B 21/157; A63B 69/0028; A63B 69/12
See application file for complete search history.

(56) References Cited

U.S. PATENT DOCUMENTS 4,114,874 A    9/1978  Mattila
4,930,770 A *  6/1990  Baker .............. A63B 21/00178
                                              482/132
(Continued)

FOREIGN PATENT DOCUMENTS

| CN | 202740743 | 2/2013 |
| KR | 20100062059 | 6/2010 |
| SU | 1535554 | 1/1990 |

OTHER PUBLICATIONS

English Abstract of SU1535554.
(Continued)

*Primary Examiner* — Huan Le
(74) *Attorney, Agent, or Firm* — Dmitry S. Kryndushkin

(57) ABSTRACT

The present device is designed for training of highly-qualified athletes in cyclic sports. The technical result is the more reliable transfer of power from a drive to a working mechanism with the possibility of smoothing out ultrashort fluctuations (0.3-0.7 seconds) in force. The athlete training device comprises two bases, each having a pulley attached thereto for rotation in a single plane. An annular cable track is fastened between the pulleys. With the aid of a motor, a rotation rate is transmitted to one of the pulleys via a shaft. The shaft, which consists of a driving part and a driven part, has mounted thereon an adjustable transmission for controlling torque. The adjustable transmission is in the form of an electromagnetic powder clutch, consisting of a driving part, connected to the driving part of the shaft, and a driven part, connected to the driven part of the shaft. The driven part of the clutch is mounted with clearance in a coaxial cavity in the driving part, the clearance gap between the driving part and the driven part of the clutch containing a ferromagnetic powder having viscosity adjusted by a clutch controller.

3 Claims, 2 Drawing Sheets

(51) Int. Cl.
  *A63B 21/00* (2006.01)
  *A63B 69/12* (2006.01)
  *A63B 24/00* (2006.01)
  *A63B 22/00* (2006.01)

(52) U.S. Cl.
  CPC ........ *A63B 21/151* (2013.01); *A63B 22/0025* (2015.10); *A63B 22/0046* (2013.01); *A63B 24/0062* (2013.01); *A63B 24/0087* (2013.01); *A63B 69/12* (2013.01); *A63B 21/4001* (2015.10); *A63B 21/4043* (2015.10); *A63B 69/125* (2013.01); *A63B 2024/0068* (2013.01); *A63B 2024/0093* (2013.01); *A63B 2225/20* (2013.01)

(56) References Cited

U.S. PATENT DOCUMENTS 5,015,926 A * 5/1991 Casler ................ A63B 21/0058
 318/9
5,391,080 A 2/1995 Bernacki
5,435,798 A * 7/1995 Habing ............ A63B 21/00181
 482/5
8,979,709 B2 3/2015 Tovask et al.

OTHER PUBLICATIONS

English Abstract of KR20100062059.
English Abstract of CN202740743.
International Search Report dated Sep. 8, 2016.
Translation of International Search Report dated Sep. 8, 2016.
Written Opinion of International Searching Authority dated Sep. 8, 2016.
Translation of Written Opinion of International Searching Authority dated Sep. 8, 2016.
International Preliminary Report on Patentability dated May 8, 2018.
Translation of International Preliminary Report on Patentability dated May 8, 2018.

* cited by examiner

ATHLETE TRAINING DEVICE

CROSS-REFERENCE TO RELATED APPLICATION

The instant application is a national phase of PCT International Application No. PCT/RU2015/000849 filed Dec. 4, 2015, and claims priority to Russian Patent Application Serial No. 2015146974 filed Nov. 2, 2015, the entire specifications of both of which are expressly incorporated herein by reference.

TECHNICAL FIELD

The proposal relates to means of individually training highly-qualified sportsmen in cyclic sports.

In high performance sports, modern highly-effective workouts are based on increasing the accuracy of the external influence on a sportsman in order to arouse the desired adaptive response of the organism. The adaptive response has its individual limits and structure. To train effectively, it is necessary to have exercise machines that permit accurately setting, reliably maintaining and instantly changing the parameters of the influences that the sportsman is exposed to.

BACKGROUND

Within the prior art, various devices for training sportsmen are known, for example, document KR 20100062059 A (Oct. 6, 2010) describes a training installation applied in cyclic sports.

A shortcoming of that technical solution consists in the impossibility of regulating the force transmitted to the sportsman from the engine.

Document SU 1535554 A1 (Jan. 15, 1990) describes a sportsman training device that contains a ropeway, a halliard that fastens a sportsman to the ropeway, sheaves, an electric motor and a transmission.

Also, within the prior art (CN 202740743 U (Feb. 20, 2013)), a sportsman training device was described that contained a transmission to regulate the force transmitted to the sportsman from the engine.

However, those technical solutions have the following shortcomings:

Insufficient reliability, lack of variability
Impossibility of leveling the ultrashort (0.3-0.7 s) fluctuations of the exertion
A narrow linear range
The risk of injury
Large consumption of electricity Thus, this useful model is aimed at eliminating all the above-mentioned shortcomings of the prior art.

SUMMARY

The main technical result of the claimed proposal consists in enhancement of the reliability of transmitting the force from the power drive to the actuator, with the possibility of leveling the ultrashort (0.3-0.7 s) fluctuations of the exertion.

The preset technical result is fully achieved by means of the aggregate of the features described in the independent claim of this proposal.

Also, the said aggregate of the features achieves the following technical results:

Increase in the degree of accuracy of dozing the exertions
Enhancement of injure prevention The claimed device is a device for speed-force leadership with a controllable transmission on the basis of an electromagnetic powder clutch, using which will make it possible to regulate not only the route movement velocity, but also the exertion transmitted to it. Such an approach will permit the sportsman to "feel" deeply and more correctly the record velocity and will safeguard them from injuries.

Independently of the velocity of movement of the ropeway, there appears the possibility of accurately setting the force applied to the sportsman. In the range of 0-150 kg, it becomes possible to regulate the force at a step of 0.1-0.3 kg, which is the most effective.

The device for training sportsmen contains two bases situated at a distance from each other; sheaves that can rotate in one plane have been secured on each of the bases. An annular ropeway has been fastened between the sheaves; one end of a halliard has been attached to the ropeway and a sportsman fastening device has been attached to its other end. An engine rotates a shaft, which transmits its rotational velocity to one of the sheaves. On the shaft, which consists of a driving part and a driven part, a regulated transmission has been installed in order to control the torque. The regulated transmission is an electromagnetic powder clutch, which consists of a driving part attached to the driving part of the shaft and a driven part attached to the driven part of the shaft. The driving and driven parts of the clutch have been made in the form of steel cylinders. An annular groove of the driven part contains an exciting winding connected to a source of direct current via contact rings and brushes. The driven part of the clutch has been installed with a clearance in the coaxial cavity of the driving part; in the clearance, between the driving part and driven part of the clutch there is ferromagnetic powder, the viscosity of which is regulated by means of a clutch controller.

The halliard is fastened to the annular ropeway by means of a clamp with a possibility of regulating its length.

The shaft's rotational speed can be regulated and controlled by means of a regulator.

BRIEF DESCRIPTION OF THE DRAWINGS

The claimed technical solution is further shown in more detail in the drawings where:

DETAILED DESCRIPTION OF THE INVENTION

Figure 1:
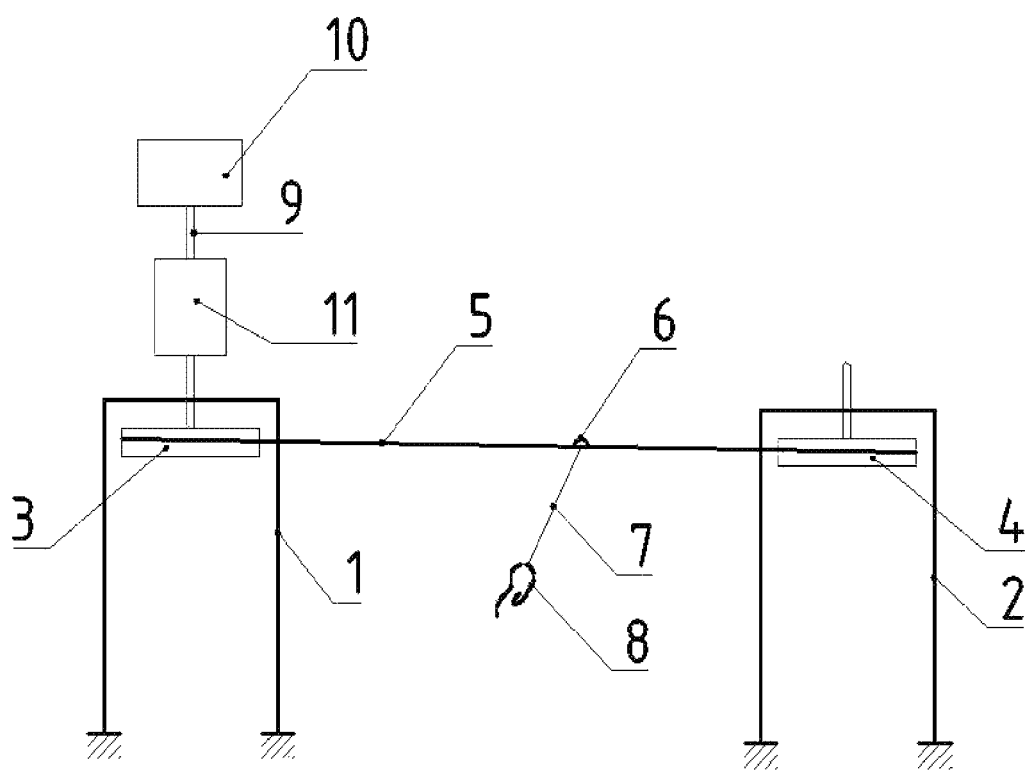
in FIG. 1 there is a schematic image of the claimed device.
Figure 2:
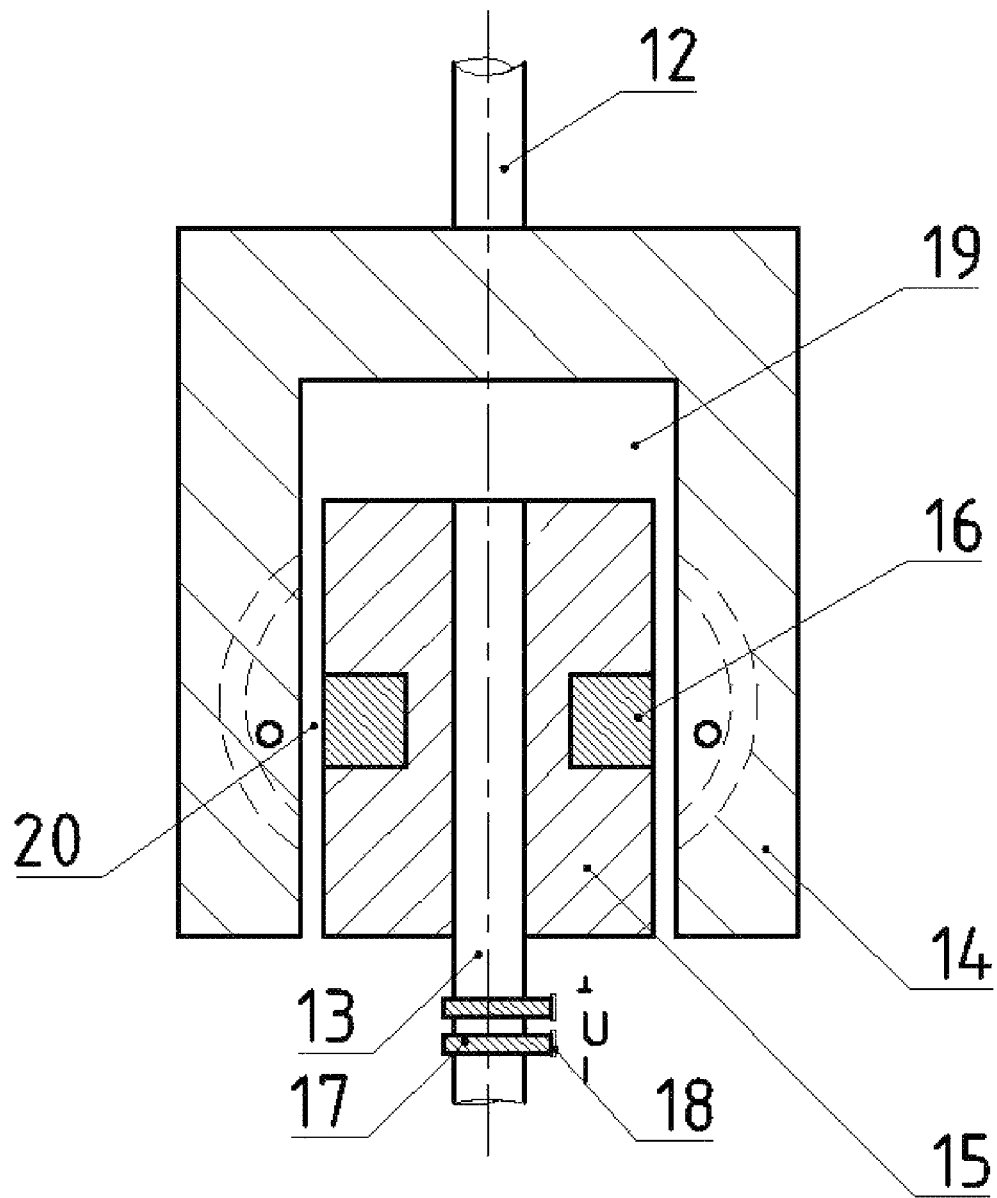
FIG. 2 shows the sectional regulated transmission.

The claimed device contains a power drive (engine), which can be an electric, internal combustion one, etc., and an actuator (the rest of the device).

The claimed device contains two bases (1, 2) situated at a distance from each other necessary for the sportsman to train; the sheaves (3, 4) that can rotate in one plane have been secured on each of the bases. The annular ropeway has been fastened (5) between the sheaves (3, 4); one end of the halliard (7) has been attached to the ropeway by means of the clamp (6), with the possibility of regulating the length of the halliard; the sportsman fastening device (8) has been attached to its other end (not shown in the figure). The engine (10) rotates the shaft (9), and its rotational velocity is transmitted to the sheave (3); the velocity can be controlled and regulated by means of the regulator. And on the shaft (9), which consists of the driving part (12) and driven part (13), the regulated transmission (11) has been installed in order to control the torque. The regulated transmission (11) is an electromagnetic powder clutch, which consists of the driving part (14) attached to the driving part (12) of the shaft (9) and of the driven part (15) attached to the driven part (13) of the shaft (9). The driving (14) and driven (15) parts of the clutch have been made in the form of steel cylinders—magnetic conductors. The annular groove of the driven part (15) contains the exciting winding (16) connected to a source of the direct current U via the contact rings (17) and brushes (18). The driven part (15) of the clutch has been installed with the clearance in the coaxial cavity (19) of the driving part (14). In the clearance between the driving part (14) and the driven part (15) of the clutch there is ferromagnetic powder (20), the viscosity of which is regulated by means of the clutch controller.

The route movement speed (measured in meters per second) is regulated by means of the engine controller (regulator), and the torque (measured in kilogram-force meters) is regulated by means of the clutch controller.

The principle of the clutch operation is the following:
when the clutch controller supplies a constant voltage U to the exciting winding, a current appears in the latter; the current generates an exciting flux that affects the ferromagnetic powder and magnetizes it. The magnetized particles of the powder create magnetic chains that form up along the magnetic lines of force. These chains transmit the force of attraction between the driving and driven parts of the clutch. The cohesion force between the driving and driven parts of the powder clutch is proportional to the current that flows through the exciting winding.

At that, the use of the claimed clutch in the claimed device ensures also the possibility of remotely regulating the value of the transmission of the torque to the sheave.

The availability of the electronic controller of the clutch operation permits accurately presetting, stably maintaining for a long time and instantly changing the characteristics of the exertion transmitted to the sportsman in conformity with their individual capabilities, current physiological state and training plan, for example, stepwise decreasing or increasing the exposure because of accumulation of tiredness directly during an exercise or from an exercise to exercise.

If the rotational speed of the clutch's driving part exceeds the one of the driven part, the self-acceleration characteristic of powder clutches makes it possible to automatically compensate the undesirable fluctuations of the intracyclic velocity of the sportsman (to which high-class sportsmen are especially sensitive and which are a separate area of training) and to maintain the necessary exertion when passing the unloaded sections of the training route (turns, changing landscape relief, etc.).

The high degree of accuracy of dosing the exertion coupled with a wide linear range is critical for the individual workouts of highly-qualified sportsmen because of the low degree of adaptation of their physical qualities and its variable dynamics. The productivity of applying such exercise machines and the need for them are closely related to the accuracy of getting within the close limits of the sportsman's current adaptation.

By virtue of the high viscosity characteristics of the clutch's working substance (ferromagnetic powder), at the same time the clutch is an effective damper between the drive (engine) and the sportsman, which decreases the probability of injuries during the falls, sport machinery failures and other emergencies.

The availability of a developed system for the remote control makes it possible to manage the training process without the trainer's moving along extensive sport facilities and to use network solutions, including the Internet. It is possible to control several devices through the Internet simultaneously.

It is possible to record the individual training profile using a computer, with subsequently analyzing the profile by the value of the controlling current supplied to the clutch. The clutch serves as a sensor of the exertion transmitted to the sportsman.

The compact, well-protected form factor permits the claimed device to operate under unfavorable environmental conditions: the high humidity of (swimming) pools or sharp drops of climatic conditions during its operation outside indoor sport structures (outdoor stadiums, winter sports).

Autonomous power sources can be used in the claimed device; if they are used for various reasons (safety requirements in swimming pools, operation under field conditions, electrical network irregularities, etc.), the electricity consumption is significantly decreased, which, in turn, positively influences the reliability of the workout by virtue of using locations independent of the electricity networks.

The invention claimed is:
1. A device for training sportsmen, comprising:
two bases situated at a distance from each other;
two sheaves that can rotate in one plane and secured one sheave on one base for both sheaves;
an annular ropeway fastened between the sheaves;
one end of a halliard attached to the ropeway and a sportsman fastening device attached to its other end;
an engine rotating a shaft, which transmits rotational velocity to one of the sheaves;
on the shaft, which includes a driving part and a driven part, a regulated transmission is installed in order to control torque;
wherein the regulated transmission is an electromagnetic powder clutch that includes a driving part attached to the driving part of the shaft and a driven part attached to the driven part of the shaft;
wherein the driving and driven parts of the clutch have been made in the form of steel cylinders;
wherein an annular groove of the driven part of the clutch contains an exciting winding connected to a source of direct current via contact rings and brushes;
wherein the driven part of the clutch is installed with a clearance in a coaxial cavity of the driving part of the clutch;
wherein, in the clearance between the driving part of the clutch and the driven part of the clutch, there is ferromagnetic powder, We viscosity of which is regulated by means of a clutch controller.
2. The device for training sportsmen according to claim 1, wherein the halliard is attached to the annular ropeway by a clamp operable to regulate its length.
3. The device for training sportsmen according to claim 1, wherein shaft's rotational speed is regulated and controlled by a regulator.

* * * * *